United States Patent
Plamthottam

(10) Patent No.: US 6,288,159 B1
(45) Date of Patent: *Sep. 11, 2001

(54) S-EB-S BLOCK COPOLYMER/OIL AQUEOUS DISPERSION AND ITS USE IN FORMING ARTICLES

(75) Inventor: Sebastian Plamthottam, Upland, CA (US)

(73) Assignee: Tactyl Technologies, Inc., Vista, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/904,839

(22) Filed: Aug. 1, 1997

Related U.S. Application Data

(63) Continuation of application No. 08/695,612, filed on Aug. 12, 1996, now Pat. No. 5,900,452.

(51) Int. Cl.⁷ .................................................. C08J 3/02
(52) U.S. Cl. ............................. 524/505; 524/575; 525/98
(58) Field of Search .................................. 524/505, 575; 525/98

(56) References Cited

U.S. PATENT DOCUMENTS

| | | |
|---|---|---|
| 2,872,427 | 2/1959 | Schroeder . |
| 3,231,635 | 1/1966 | Holden et al. . |
| 3,238,173 | 3/1966 | Balley et al. ................... 524/505 |
| 3,265,765 | 8/1966 | Holden et al. . |
| 3,322,856 | 5/1967 | Holden et al. . |
| 3,360,599 | 12/1967 | Nyberg et al. ................... 264/216 |
| 3,485,787 | 12/1969 | Haefele et al. . |
| 3,503,917 | 3/1970 | Burke, Jr. ................... 523/328 |
| 3,700,633 | 10/1972 | Wald et al. . |
| 3,830,767 | 8/1974 | Condon . |
| 3,867,321 | 2/1975 | Riew . |
| 3,933,723 | 1/1976 | Grenness . |
| 3,970,771 | 7/1976 | Davison . |
| 4,006,116 | 2/1977 | Dominguez . |
| 4,033,888 | 7/1977 | Kiovsky . |
| 4,039,629 | 8/1977 | Himes et al. . |
| 4,041,103 | 8/1977 | Davison et al. . |
| 4,070,713 | 1/1978 | Stockum . |
| 4,077,893 | 3/1978 | Kiovsky . |
| 4,141,847 | 2/1979 | Kiovsky . |
| 4,143,109 | 3/1979 | Stockum . |
| 4,145,377 | 3/1979 | Bussink et al. . |
| 4,148,771 | 4/1979 | Nash . |
| 4,154,712 | 5/1979 | Lee, Jr. . |
| 4,161,472 | 7/1979 | Lehr . |
| 4,163,077 | 7/1979 | Antonsen et al. . |
| 4,163,764 | 8/1979 | Nash . |
| 4,166,055 | 8/1979 | Lee, Jr. . |
| 4,167,507 | 9/1979 | Haaf . |
| 4,178,337 | 12/1979 | Hall et al. . |
| 4,181,644 | 1/1980 | Lehr . |
| 4,199,490 | 4/1980 | Kamiya et al. . |
| 4,201,834 | 5/1980 | Hanno et al. . |
| 4,216,131 | 8/1980 | Himes et al. . |
| 4,248,759 | 2/1981 | St. Clair . |
| 4,291,139 | 9/1981 | Halasa et al. . |
| 4,361,507 | 11/1982 | Bourland . |
| 4,386,179 | 5/1983 | Sterling . |
| 4,391,949 | 7/1983 | St. Clair . |
| 4,394,915 | 7/1983 | Nelson . |
| 4,481,323 | 11/1984 | Sterling . |
| 4,511,354 | 4/1985 | Sterling . |
| 4,613,640 | 9/1986 | Deisler et al. . |
| 4,616,065 | 10/1986 | Hargis et al. . |
| 4,618,213 | 10/1986 | Chen . |
| 4,716,183 | 12/1987 | Gamarra et al. . |
| 4,769,415 | 9/1988 | Hotta et al. . |
| 4,814,375 | 3/1989 | Esposito . |
| 4,880,878 | 11/1989 | Himes et al. . |
| 4,882,378 | 11/1989 | Himes . |
| 4,970,259 | 11/1990 | Mitchell et al. . |
| 5,068,138 | 11/1991 | Mitchell et al. . |
| 5,112,900 | 5/1992 | Buddenhagen et al. ............. 524/484 |
| 5,120,765 | 6/1992 | Southwick et al. ................. 524/505 |
| 5,149,736 | 9/1992 | Gamarra . |
| 5,262,468 | 11/1993 | Chen . |
| 5,334,646 | 8/1994 | Chen . |
| 5,407,715 | 4/1995 | Buddenhagen et al. ............ 428/35.7 |

(List continued on next page.)

FOREIGN PATENT DOCUMENTS

| | | |
|---|---|---|
| 0224389 A2 | 6/1987 | (EP) . |
| 0254346 A2 | 1/1988 | (EP) . |
| 0488021 A1 | 6/1992 | (EP) . |
| 9005166 | 5/1990 | (WO) . |
| WO94/15997 | 7/1994 | (WO) . |
| 9420574 | 9/1994 | (WO) . |
| 9500586 | 1/1995 | (WO) . |
| 9615189 | 5/1996 | (WO) . |

OTHER PUBLICATIONS

Supplementary EPO Search Report dated Apr. 29. 1999.

*Primary Examiner*—James J. Seidleck
*Assistant Examiner*—Olga Asinovsky
(74) *Attorney, Agent, or Firm*—Dority & Manning, P.A.

(57) ABSTRACT

A dispersion has particles dispersed in a continuous aqueous dispersion medium. The particles, preferably no more than about 2 micrometers in size, are formed of a mixture of styrene-ethylene/butylene-styrene (S-EB-S) block copolymer having end blocks each with a weight average molecular weight of more than about 15,000 Daltons and an oil such as a mineral oil. The dispersion medium is a mixture of water and a surfactant. Articles are prepared by dipping a form into the dispersion and withdrawing the form to leave a film of the dispersion on the form. The water is evaporated from the film, leaving a coherent extensible film on the form.

12 Claims, 2 Drawing Sheets

U.S. PATENT DOCUMENTS

| | | |
|---|---|---|
| 5,409,739 | 4/1995 | Liu . |
| 5,444,121 | 8/1995 | Grennes et al. . |
| 5,451,439 | 9/1995 | Bigg . |
| 5,508,334 | 4/1996 | Chen . |
| 5,556,911 | 9/1996 | Walther et al. ........................ 524/505 |
| 5,563,204 | 10/1996 | Speth et al. . |
| 5,578,674 | 11/1996 | Speth et al. .......................... 524/575 |
| 5,742,943 | 4/1998 | Chen . |
| 5,851,683 | 12/1998 | Plamthottam et al. . |
| 5,863,977 | 1/1999 | Fischer et al. . |
| 5,900,452 | 5/1999 | Plamthottam . |
| 5,905,097 | 5/1999 | Walther . |
| 5,985,392 | 11/1999 | Hert et al. . |
| 5,990,217 | 11/1999 | Nakano et al. . |
| 5,994,450 | 11/1999 | Pearce . |
| 6,021,524 | 2/2000 | Wu et al. . |
| 6,043,315 | 3/2000 | Gottschalk et al. . |
| 6,046,275 | 4/2000 | Nakano et al. . |
| 6,048,932 | 4/2000 | Okada et al. . |
| 6,087,435 | 7/2000 | Nakano et al. . |
| 6,093,768 | 7/2000 | Nakano et al. . |

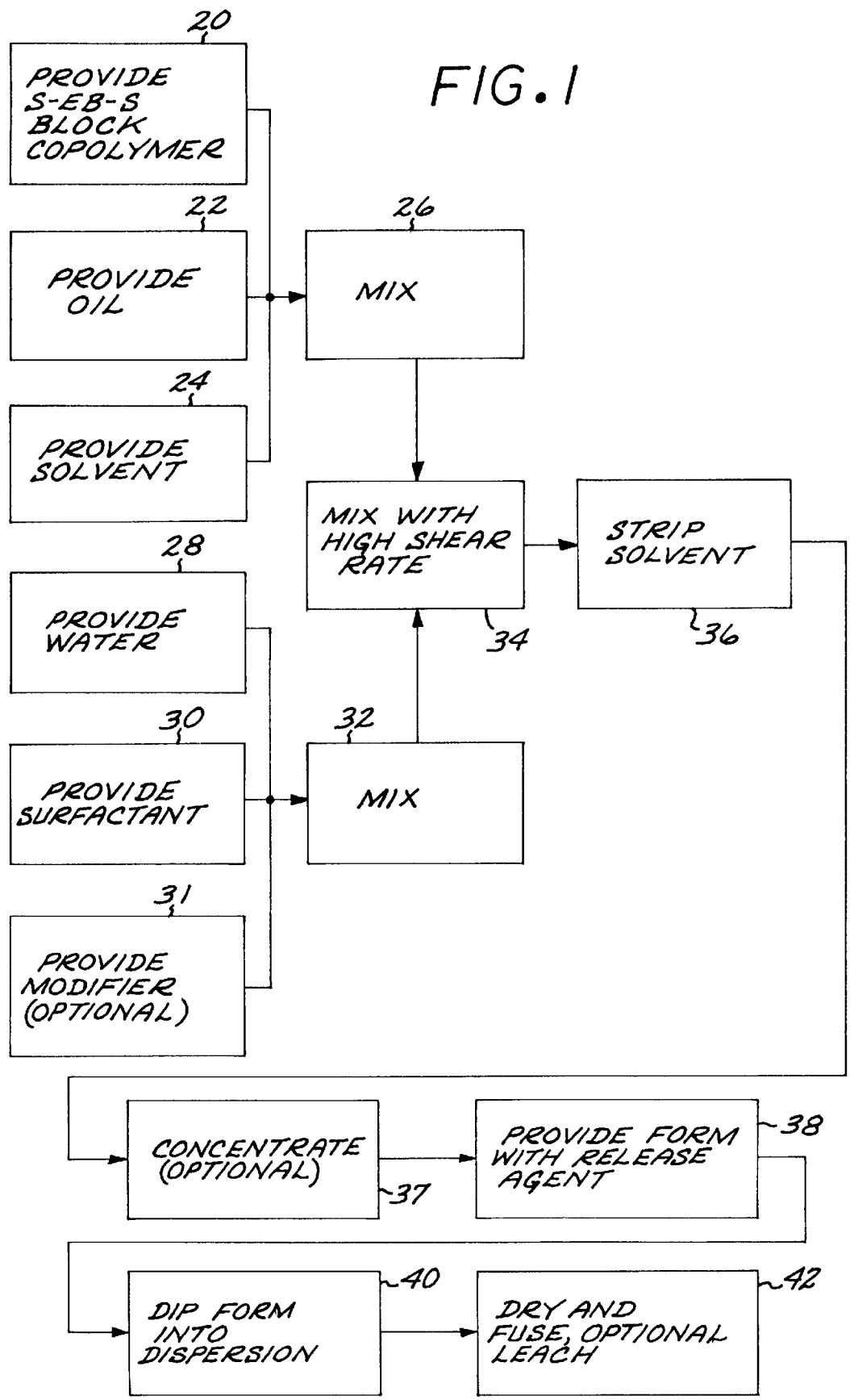

S-EB-S BLOCK COPOLYMER/OIL AQUEOUS DISPERSION AND ITS USE IN FORMING ARTICLES

This application is a continuation application Ser. No. 08/695,612, filed Aug. 12, 1996, U.S. Pat. No. 5,900,452, for which priority is claimed.

BACKGROUND OF THE INVENTION

This invention relates to aqueous dispersions of S-EB-S block copolymer and the use of such aqueous dispersions in forming articles, preferably by dip forming.

Thin-walled, extensible articles such as gloves, condoms, and other products have long been made from natural rubber. In normal production, such articles are formed from natural rubber latex, a naturally occurring emulsion of rubber and water, with added stabilizing agents and vulcanizing chemicals. A form of the appropriate shape, previously coated with a coagulating solution in some cases, is dipped into the latex mixture once or several times to build up a layer of the desired thickness. The water is allowed to evaporate, leaving a solid rubber film. The film must be vulcanized to provide adequate mechanical and physical properties.

Natural rubber has many advantages in these applications, being strong and highly elastic and having good "tactility" or feeling to the user. Natural rubber has several shortcomings, such as susceptibility to "pinholes" therethrough, rapid attack by ozone which causes scission cracking, and oxidative attack during storage which causes cracking and destroys the physical integrity of the product. Natural rubber is also not hypoallergenic due to the residual surfactants, vulcanizing agents, stabilizing agents, antioxidants, and/or protein materials in the rubber. Persons who are particularly susceptible to irritation or sensitization, or who use the rubber products for extended periods of time, may experience allergic reactions.

Various types of synthetic elastomeric polymer products have been developed for use in thin articles produced by dip forming. Synthetic rubber compositions may be dissolved in solvents to form a true solution, so that pinholes are much less likely to be present. Many available synthetic rubber compositions have various other shortcomings, including unacceptable tactility. While each such composition may meet some of the requirements, most do not have the required combination of strength, tactility, resistance to environmental damage, and hypoallergenicity required for many products such as examination and surgical gloves, condoms, and other medical products that are to come into contact with the human body.

An important advance in the art of synthetic elastomeric polymer products is described in U.S. Pat. Nos. 5,112,900 and 5,407,715. These patents disclose the preparation of specific styrene-ethylene/butylene-styrene (S-EB-S) block copolymer solutions and their use in the dip forming of articles. The resulting articles have excellent elastomeric properties for use in gloves, condoms, and other products. They exhibit low incidence of pinholes, good resistance to environmental damage such as oxidation and ozonation, and hypoallergenicity.

There is, however, always a need to further improve the manufacturability of articles made of such formulations and the process economics. The present invention fulfills this need, and further provides related advantages.

SUMMARY OF THE INVENTION

The present invention provides an S-EB-S aqueous dispersion and an approach for utilizing that aqueous dispersion in the preparation of thin elastomeric articles. The articles have the desirable characteristics of comparable articles made from S-EB-S solutions, including excellent elastomeric properties, low incidence of pinholes, good resistance to environmental damage such as oxidation and ozonation, and hypoallergenicity. The present approach is compatible with related technology such as the use of powders and powder-free techniques for improving the donnability of the articles. Additionally, the dispersion-based dip-forming manufacturing operation functions at greater rates for improved process economics, as compared with the prior approach of dip forming from S-EB-S solutions. Thicker layers or articles may be made in each dip-forming step. The manufacturing operation is also safer due to the absence of toxic solvents during the dip-forming process.

In accordance with the invention, an aqueous dispersion comprises a dispersion medium comprising a mixture of water and a surfactant, and a plurality of particles dispersed in the dispersion medium. Each particle comprises a mixture of an S-EB-S (styrene-ethylene/butylene-styrene) block copolymer, and an oil such as a mineral oil. Most preferably, the particles are of an average size of no greater than about 2 micrometers. The S-EB-S block copolymer, which may be formed of molecules of substantially the same molecular weight or mixtures of two or more molecular weights, preferably having weight average end block molecular weights of each of the end blocks of more than about 15,000 Daltons.

The aqueous dispersion may be used in a dip-forming method for manufacturing thin-walled articles. In accordance with this aspect of the invention, a method for the preparation of an elastomeric article comprises the steps of furnishing an aqueous dispersion of the type described, dipping a form into the aqueous dispersion and withdrawing the form from the aqueous dispersion, leaving a film of the dispersion on the form, and evaporating the water from the dispersion on the form and fusing the remaining polymeric material, leaving a coherent extensible film on the form. The aqueous dispersion used in the dip-forming method is substantially free of non-aqueous solvents, but trace amounts that may be present are not detrimental in the dip-forming process, and may, in some cases, be beneficial in forming a coherent film.

The aqueous dispersion may be used in conjunction with other processing techniques. For example, the aqueous dispersion may be used in the coagulant dipping process that is utilized for natural latex rubber compounds. It also may be used, for example, in spray coating or slush molding operations.

The resulting article has the desirable features associated with the S-EB-S block copolymer as described U.S. Pat. Nos. 5,112,900 and 5,407,715, whose disclosures are incorporated by reference. Additionally, the articles may be made much more quickly than possible with the solution-based approach described in these prior patents. In the manufacturing operation, the dispersion is normally made at a location which has apparatus for disposing of the potentially toxic solvent vapors evolved during preparation of the dispersion. The dip-forming operation may be performed elsewhere. Because there is no potentially toxic solvent evolved in the dip-forming operation, there is little risk of injury to workers on the dip-forming and drying line.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a block flow diagram of a preferred approach for practicing the invention;

DETAILED DESCRIPTION OF THE INVENTION

Figure 2A:
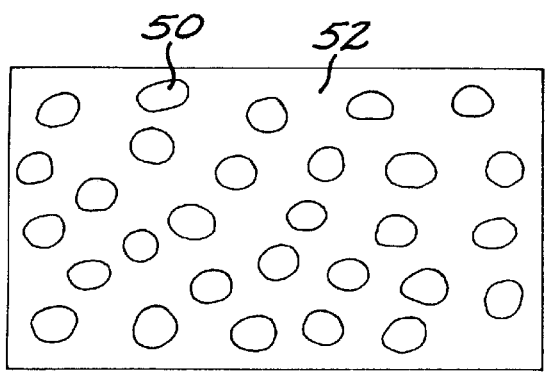
FIG. 2A is a schematic microstructural view of an (S-EB-S/oil)-in-(water/surfactant) aqueous dispersion.

FIG. 1 is a block flow diagram depicting a preferred approach for preparing an aqueous dispersion in accordance with the invention, and then for using that aqueous dispersion to prepare an article by dip forming.

A styrene-ethylene/butylene-styrene (S-EB-S) block copolymer is provided, numeral 20. The S-EB-S block copolymer is formed from an ethylene-butylene copolymer central block and polystyrene end blocks. The polystyrene end blocks each have a weight average molecular weight of at least about 15,000 Daltons, and, more preferably, at least from about 18,000 to about 20,000 Daltons. Because there is a relatively large amount of oil in the dip-forming solution, it is beneficial that the S-EB-S block copolymer have a high end block polystyrene content, achieved with these end block molecular weights.

If the weight average molecular weights of each of the end blocks are less than about 15,000, articles can be formed by dip forming, but their strengths are reduced and unacceptably low for some applications. Such articles have poor mechanical properties. Dip formed articles made using S-EB-S block copolymers having end block weights of less than about 15,000 tend to crack during drying and fusion, due to their poor mechanical properties at elevated temperatures. On the other hand, when the weight average molecular weight of the polystyrene end blocks exceeds about 15,000 Daltons, and is preferably in the 18,000 to 20,000 Daltons range, the films exhibit superior strength properties and no crack formation during drying and fusion. In this case, it is desirable to have one S-EB-S block copolymer component with a total weight average molecular weight exceeding at least about 150,000 Daltons. When the weight average molecular weight of the polystyrene end blocks exceeds about 24,000 Daltons, the dispersion has good film-forming properties in dip forming, but the physical properties are not as good as those where the weight average molecular weight is in the 18,000 to 20,000 range.

The polystyrene end blocks typically constitute about 25–35 percent by weight of the total molecule. The total molecular weight of the copolymer is typically from about 50,000 to about 300,000 Daltons.

The S-EB-S block copolymer may optionally have end-block compatible resins added to the polystyrene end blocks. The added end-block compatible resin increases the glass transition temperature ($T_g$) of the S-EB-S block copolymer. The increased $T_g$ allows the final products to be used at higher temperatures than otherwise possible, as the product tends to become somewhat sticky at and above $T_g$. An example of such an end-block compatible resin is poly alpha methyl styrene.

The S-EB-S block copolymer is to be distinguished from other block copolymers that have sometimes been used in synthetic rubber compositions, such as styrene-isoprene-styrene (S-I-S) and styrene-polybutydiene-styrene (S-B-S) block copolymers. It has been known to make thin rubber-like articles from S-I-S and S-B-S block copolymers, see for example, U.S. Pat. No. 3,933,723. The use of these S-I-S and S-B-S block copolymers eliminates the need for vulcanization of the articles, but the articles are subject to oxidation and ozone damage.

The use of an S-EB-S block copolymer, as distinct from other types, is critical to the success of the present invention, for two reasons. First, elastomers based upon the S-EB-S block elastomeric triblock copolymers are resistant to attack by ozone, or by oxidative conditions, while S-I-S and S-B-S elastomers suffer from rapid cracking, when exposed to ozone, and cracking or hardening under oxidative conditions. Both of the latter copolymers are thus subject to failure even when protected by specific additives such as antiozonants or antioxidants which are deleterious in medical and other applications. The use of such special additives is undesirable, as they may cause allergic reactions in some persons. The present elastomeric composition is hypoallergenic and may be contacted with the skin of the user for extended periods of time. Additionally, in spite of the special additives, scission cracking can lead to premature failure by ozone cracking of the articles made from S-I-S and S-B-S compositions, particularly when the articles are stored in a folded condition and then stretched before and during use.

Second, the mechanical properties of the S-EB-S triblock copolymers may be selected to provide the desirable combination of tensile strength, elasticity, and tactility that is required in some applications. S-EB-S elastomeric triblock copolymers have higher tensile strength, lower elastic elongation, and higher stress at 50–500 percent elongation than the S-I-S and S-B-S triblock elastomers.

The structure, properties, and some applications of some S-EB-S elastomers have been disclosed in U.S. Pat. Nos. 3,485,787; 3,830,767; 4,006,116; 4,039,629; 4,041,103; 4,386,179; 4,481,323; 4,511,354; and 4,613,640, whose disclosures are incorporated by reference.

The S-EB-S block copolymers are available commercially in a range of solution viscosity/copolymer concentration values. The solution viscosity/copolymer concentration value is determined by measuring the viscosity of a copolymer that has been previously dissolved in a solvent at a specified level. The solution viscosity/copolymer concentration value is a conventional approach for uniquely defining the nature of a block copolymer whose central and end block content has been specified by type and relative amount. For example, an S-EB-S block copolymer is uniquely specified by the stated composition of polystyrene end blocks and poly-(ethylene-butylene) central blocks, the relative amount of end blocks and central blocks, and the solution viscosity/copolymer concentration. Thus, a block copolymer is uniquely defined by stating that it is of the S-EB-S type, that the percentage of polystyrene end blocks is, for example, 28 percent by weight of the total copolymer, and that the Brookfield Viscosity of a 20 weight percent solution in toluene at 77° F. is 1500 cps.

The commercially available S-EB-S block copolymers are manufactured in a precise manner so that each of the commercially available materials is closely controlled to meet such standards. Shell Kraton G1650 is an S-EB-S block copolymer having a styrene/central block ratio of 28/72 and a Brookfield Viscosity in toluene solution (20 percent concentration by weight) at 77° F. of 1500. Shell Kraton G1651 is an S-EB-S block copolymer having a styrene/central block ratio of 33/67 and a Brookfield Viscosity in toluene solution (20 percent concentration by weight) at 77° F. of 2000. Shell Kraton G1652 is an S-EB-S block copolymer having a styrene/central block ratio of 29/71 and a Brookfield Viscosity in toluene solution (20 percent concentration by weight) at 77° F. of 550.

The S-EB-S block copolymer may comprise molecules with substantially the same molecular weight. It may also comprise mixtures of molecules with two or more different molecular weights. The molecular weights and/or mixtures of molecular weights are selected to contribute to achieving desired mechanical properties in the final product. For example, in one preferred embodiment, mixtures of S-EB-S molecules as disclosed in U.S. Pat. Nos. 5,112,900 and 5,407,715 are utilized in order to achieve the required mechanical properties to meet ASTM specifications. The present studies have demonstrated that S-EB-S polymer blend compositions in most cases exhibit superior film properties compared to typical single commercial polymers, although the formulations with a single commercial polymer are suitable for at least some applications. In particular, S-EB-S polymer blends with at least one polymer with a high weight average molecular weight such as Kraton G1651 tend to have performance superior to other S-EB-S blends.

An oil (also sometimes termed a "plasticizer") is provided, numeral 22. The oil is preferably a mineral oil, which is a refined petroleum paraffinic hydrocarbon oil described in Entries 6971 and 6972 of the Merck Index, Eighth Edition. The preferred mineral oil has a specific gravity of 0.87 at 77° F., a viscosity of 170 centistokes at 77° F., and a Hirschler molecular weight of 492. The selected oil should not swell or solubilize the polystyrene end segments. Formulations with high levels of oil form more stable dispersions with less surfactant than other formulations.

The S-EB-S block copolymer is furnished by the manufacturer as a solid. To form a mixture from which a suitable dispersion may be prepared, a solvent (toluene or cyclohexane in the preferred approach) is provided, numeral 24. The S-EB-S block copolymers and the mineral oil plasticizer are mixed together and dissolved in a mutual solvent, preferably toluene or cyclohexane, numeral 26.

A dispersion medium is prepared from water, numeral 28, and a surfactant, numeral 30. The surfactant may be an anionic or cationic form, or a mixture of ionic and nonionic types. Suitable surfactants are disclosed in U.S. Pat. Nos. 3,360,599; 3,305,917; and 5,120,765, whose disclosures are incorporated by reference. The preferred surfactant is an anionic surfactant. Cationic surfactants are operable but less preferred, because cationic surfactants may be allergenic but most anionic surfactants are hypoallergenic. Although most of the surfactant and its residues are leached out and removed during the manufacturing operation, small amounts may remain and may cause an allergic reaction in the product user, if the surfactant is not hypoallergenic. The surfactant 30 is mixed with the water, numeral 32, in an amount of from about 1 to about 5 percent by volume. The surfactant 30 may also be produced in situ by adding and reacting surfactant-forming chemicals. For example, oleic acid added to the oil phase (the S-EB-S solution) and potassium hydroxide added to the water phase react to form the surfactant potassium oleate upon mixing.

Optionally, modifying additives such as thickeners, defoamers, or buffers may also be supplied and added to the aqueous dispersion medium, numeral 31.

The mixture 26 of S-EB-S, oil, and solvent is mixed together with the mixture 32 of water and surfactant, numeral 34. The mixing 34 is performed under high-speed, high-shear-rate conditions using a mixer designed to produce dispersions. A preferred mixer is a rotor/stator mixer such as an X-series 410-X6 mixer available from Charles Ross & Co or a Microfluidizer M210 available from Microfluidics Co. Several high-shear mixing passes may be required to obtain the desired particle size.

After dispersing step 34, the solvent (toluene or cyclohexane in the preferred approach) is removed from the dispersion, numeral 36, a step often termed "stripping". Stripping may be accomplished by any operable approach, with heat/vacuum stripping and steam stripping preferred. The solvent has the highest vapor pressure of any of the components and is therefore vaporized and drawn out of the dispersion. Additional water may be added in step 36, or water may be removed by heating or other approach in a concentration step 37. Optionally, a biocide may be added in step 37 as well.

Equivalently to the procedure discussed in relation to steps 20–36, the components may be mixed and the dispersion formed in other orders and by other paths. In one approach, for example, the S-EB-S block copolymer, the solvent, and some of the water are mixed together under high-shear conditions to form a first dispersion, and the oil and additional water are mixed together under high-shear conditions to form a second dispersion. Modifiers may be dispersed into either of the dispersions. The solvent is stripped from the first dispersion. The stripped first dispersion and the second dispersion are thereafter mixed to form a third dispersion.

Figure 2B:
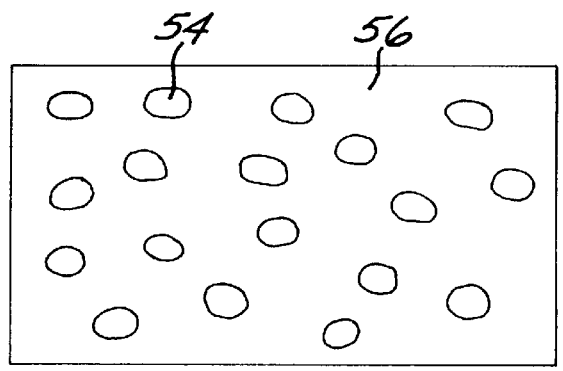
FIG. 2B is a schematic microstructural view of a (water/surfactant)-in-(S-EB-S/oil) aqueous dispersion.

FIGS. 2A and 2B illustrate two possible types of dispersions produced by the present approach of steps 20–36, an (S-EB-S/oil)-in-(water/surfactant) aqueous dispersion (FIG. 2A) and a (water/surfactant)-in-(S-EB-S/oil) aqueous dispersion (FIG. 2B). The type of dispersion produced is responsive to the relative amounts of the mixture 26 and the mixture 32 that remain after the stripping step 36, as well as the type and amount of the surfactant (which alters the surface energies of the phases). If a relatively small amount of (S-EB-S/oil)-solvent mixture is present, as compared with the amount of (water/surfactant) mixture, the dispersion has a structure of discrete droplets 50 of (S-EB-S/oil)-solvent mixture in a continuous (water/surfactant) phase 52, as depicted in FIG. 2A. In the dispersion of FIG. 2A, the (S-EB-S/oil) particles 50 are generally spherical with an average size of no more than about 2 micrometers. If the particles are significantly larger, they have a tendency to separate and the dispersion is not stable. If a relatively large amount of (S-EB-S/oil)-solvent mixture is present, as compared with the amount of (water/surfactant) mixture, the dispersion has a structure of discrete droplets 54 of (water/surfactant) phase in a continuous (S-EB-S/oil)-solvent mixture 56, as depicted in FIG. 2B. (The water/surfactant phase is termed the "dispersion medium" herein, whether it forms the continuous phase or, during intermediate stages of the processing, the dispersed phase.)

The (S-EB-S/oil)-in-(water/surfactant) aqueous dispersion of FIG. 2A is useful for dip-forming operations. The (water/surfactant)-in-(S-EB-S/oil/solvent) aqueous dispersion (FIG. 2B) is a transient system present only during the preparation of the aqueous dispersion used in dip-forming operations.

Both types of dispersions of FIGS. 2A and 2B may be present at different times (but not coexisting) during the course of the preparation of the dispersion in steps 20–34. For example, in a preferred inverse-dispersion approach as described in U.S. Pat. Nos. 2,872,427 and 3,867,321, and Canadian Patent 876,153, all of whose disclosures are incorporated by reference, the mixture 26 may be prepared with a relatively high content of solvent, so that the volume of the S-EB-S/oil/solvent mixture 26 is large as compared with that of the water/surfactant mixture 32. The high-shear-rate mixing step 34 produces a dispersion of water/surfactant mixture in S-EB-S/oil/solvent. When, however, the solvent is vacuum stripped and optionally more water is added in step 36, the relative volume of the remaining (S-EB-S/oil) mixture is much less, so that the dispersion inverts, resulting in the (S-EB-S/oil)-in-(water/surfactant) aqueous dispersion of FIG. 2A. Thus, the point in the processing at which the nature of the dispersion is to be judged is after the stripping step 36, not at earlier stages of the process.

Any other operable method for producing a dispersion may be used as well. Examples of such approaches are disclosed in U.S. Pat. Nos. 3,238,173, 3,503,917, and 5,120,765, whose disclosures are incorporated by reference.

Figure 3:
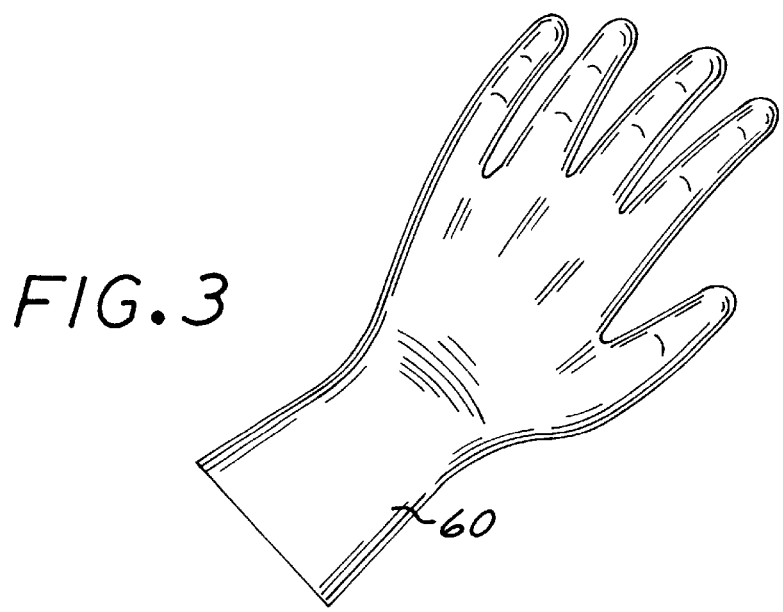
FIG. 3 is a perspective view of a glove form.
Figure 4:
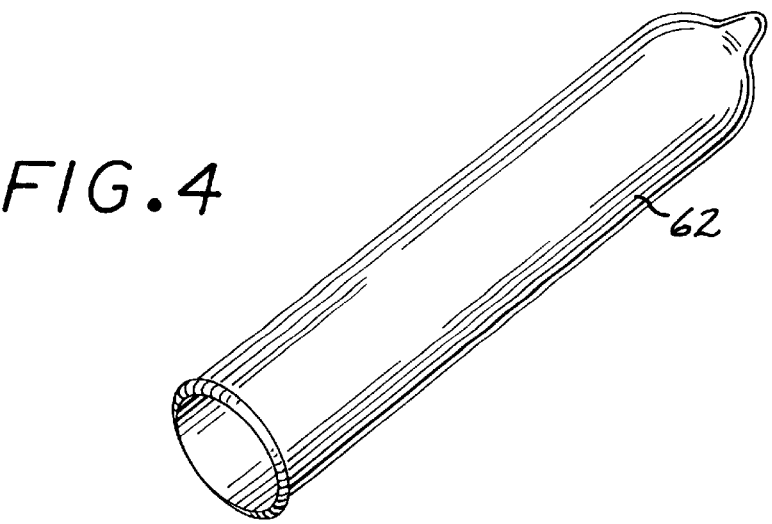
FIG. 4 is a perspective view of a male condom form.

The dispersion prepared by the steps 20–36 is preferably used in a dip forming operation. (Although, as discussed earlier, it may be used in other types of forming and applying techniques as well.) Dip-forming technology is generally known for other applications, and will be described only briefly here. A form is provided, numeral 38. Any operable form may be used, and examples of such forms of most interest to the inventor include a human hand form 60, FIG. 3, and a cylinder form 62 with a closed end, FIG. 4. The hand form 60 is used to make elastomeric gloves, and the cylinder form 62 is used to make male condoms.

Articles are prepared by first dipping the form into a volume of the dispersion numeral 40, and thereafter evaporating the water (i.e., drying) and fusing the film, and optionally leaching the film, numeral 42. The preferred drying temperature is in the range of about 30° C. to about 100° C., most preferably from about 70° C. to about 90° C. Fusing is typically accomplished by heating the article to a temperature above the softening point of the end blocks of the S-EB-S block copolymer for a period of time. For conventional S-EB-S block copolymers, the fusing treatment is preferably in the range of about 120° C. to about 150° C., most preferably in the range of about 130° C. to about 140° C., in all cases for no more than about 25 minutes. The high temperatures aid in achieving good mechanical properties. The S-EB-S block copolymer is stable at these temperatures. These conditions also allow making articles on dip lines designed for natural rubber dipping. However, as discussed herein, the S-EB-S block copolymers may be modified to increase their glass transition temperatures, so that the fusing temperature will correspondingly be increased. The times and temperatures of the fusing treatment may be varied, with shorter times used for higher temperatures and longer times used for lower temperatures.

Optionally, the final article may be leached in warm water to remove any residual surfactants. The preferred leach time is 10 minutes or less, preferably 5 minutes or less. Improved leach conditions of longer times and warmer temperatures provide improved film properties. The preferred leach temperatures are in the range of from about 30° C. to about 90° C.

To prepare such an article, a sufficiently large amount of the dispersion is prepared in the manner described and placed into a dipping tank, at ambient temperature. A commercially available form (typically made of aluminum, glass, plastic, or porcelain) in the shape of the desired article is coated with a release agent such as calcium carbonate slurry or calcium stearate. The form is thereafter dipped into the tank and removed slowly, leaving a thin, uniform layer of the aqueous dispersion deposited onto the form, much in the same manner that a layer of paint would be deposited upon the form if it were dipped into a container of paint. During dipping, the dispersion is distributed evenly over the surface of the form by a combination of rotational and wavy motions applied to the form. The form and overlying layer of dispersion are dried in a stream of air to permit the water in the thin elastomeric layer to evaporate, at ambient or elevated temperature. Each dipped and dried layer is typically about 0.03–0.20 millimeters thick. The dipping procedure is repeated as necessary to build up a completed layer of the required thickness. Thin articles prepared according to the dipping process of the invention have thicknesses of from about 0.03 to about 1.0 millimeter, depending upon the thickness per layer and the number of layers. It is difficult to maintain the integrity of layers of less than about 0.03 millimeters thickness. It is difficult to prepare articles more than about 1.0 millimeter thick by dip forming. After drying and fusion of the film, the article is removed from the form, which is then reused. The article may be modified or treated in ways consistent with the present approach as, for example, by powdering the surface to allow it to be slipped onto the body more easily, or provided with a compatible non-powder surface layer to permit easy donning.

There are several practical considerations in commercial dip forming of articles by the present approach. The solids levels in the dispersion into which the form is dipped is in the range of from about 30 to about 65 weight percent, most preferably from about 55 to about 63 weight percent. At about 55 weight percent solids, many dips are required to achieve desired glove thickness to meet ASTM specifications. At about 60 to about 63 weight percent solids, 2–3 dips provide satisfactory films of 0.25 to 0.3 millimeters thickness. Dipping conditions such as former temperature and extraction speed may be varied to achieve the desired thickness. A uniform film is achieved by rotation or wavy motion of the form. Thicker films may be made with lower solids content of the dispersion or by modifying the viscosity of the dispersion by adding thickeners. The preferred dip method does not use a coagulant on the form. Other dipping processes may also be used. A bead may be formed easily when the film is hot, preferably after exiting the fusion oven.

The following examples illustrate the application and practice of the present invention. These examples are presented by way of illustration and not of limitation, and should not be interpreted as limiting of the invention in any respect.

EXAMPLE 1

About 150 grams of a 16 weight percent toluene solution of 40 parts by weight Kraton G1650, 40 parts by weight Kraton G1651, and 10 parts by weight Kraton G1652 S-EB-S block copolymers, and containing 56 phr oil, was dispersed in about 100 grams of water containing 1 gram of Emcol K-8300 surfactant obtained from Witco Chemical. Dispersion was accomplished with a rotor/stator assembly under high shear conditions for two minutes. The solvent was stripped off in a rotovap under heat and vacuum, and the solution diluted by adding water. The dispersion was used in a dip-forming operation to form an elastomer film.

EXAMPLE 2

About 150 grams of a cyclohexane solution of 40 parts by weight Kraton G1650, 40 parts by weight Kraton G1651, and 10 parts by weight Kraton G1652 S-EB-S block copolymers, and containing 48 phr oil, was dispersed in about 150 grams of water containing 0.67 grams of sulfosuccinate surfactant. Dispersion was accomplished with a rotor/stator assembly under high shear conditions for two minutes. The cyclohexane was stripped off and the dispersion concentrated to obtain an aqueous dispersion of S-EB-S block copolymer and oil. The dispersion was used in a dip-forming operation to form an elastomer film, which was dried and fused at 80–95° C. for 10–20 minutes. The resulting film exhibited excellent mechanical strength properties.

EXAMPLE 3

A dispersion was made as in Example 1, except that the final dispersion contained 2.5 weight percent Emcol K-8300 surfactant. The film produced in dip forming was fused at 80–95° C. for 10–20 minutes. The resulting film exhibited excellent mechanical strength properties.

EXAMPLE 4

An S-EB-S polymer blend composition was prepared by dissolving 103.13 grams of Kraton 01651, 154.69 grams of Kraton 01650, and 154.69 grams of mineral oil in 2088 grams of toluene. The weight average molecular weight of the polystyrene end blocks was estimated to be about 18,000 Daltons. An aqueous dispersion was prepared using 600 grams of this solution and 466 grams of water containing 3.25 grams of Emcol K-8300 and 3.25 grams of potassium rosin soap. The dispersion was concentrated by vacuum and heat in a rotovap after stripping the toluene. The resulting aqueous dispersion had a solids content of about 54 percent by weight.

Films were dip formed from this dispersion using warm glass condom formers, using multiple dips to obtain a thickness of 0.05–0.09 millimeters. The film was dried at about 70–80° C. after each dip. After the last dip, the film was heated at 130° C. for 5 minutes and then leached in warm water for 5 minutes. The film was then heated to 130° C. for 25 minutes, cooled, and stripped from the form after application of powder. The condoms produced in this manner had a tensile strength of 22.37 MPa, a modulus at 500 percent elongation of 2.69 MPa, and an elongation at break of 812 percent.

EXAMPLE 5

An S-EB-S blend formulation was prepared as in Example 4, except that the blend contained 127.74 grams of Kraton G1651, 151.68 grams of Kraton G1650, 31.94 grams of Kraton G1652, and 175.64 grams of mineral oil. The weight average molecular weight of the polystyrene end blocks of the blend is estimated to be 17,800 Daltons.

An aqueous dispersion was prepared as in Example 4, and dispersion concentrated to 63.23 weight percent solids. Condoms were prepared as in Example 4 in a thickness range of 0.1 to 0.16 millimeters. The films had a tensile strength of 23.78 MPa, a modulus at 500 percent elongation of 2.94 MPa, and an elongation at break of 839 percent.

Samples of the condoms were sterilized by gamma radiation at a dose of 29.9 KGy to 39.1 KGy. These samples showed a tensile strength of 20.61 MPa, a modulus at 500 percent elongation of 2.64 MPa, and an elongation at break of 897 percent.

EXAMPLE 6

An S-EB-S blend formulation was prepared as in Example 4, but containing 70 phr of mineral oil. The weight average molecular weight of the polystyrene end blocks is estimated to be 18,000 Daltons as in Example 4. Dispersions and films were prepared as in Example 4, using 600 grams of the blend solution and 466 grams of water containing 3.25 grams of Emcol K-8300 and 4 grams of DRS 42 surfactant obtained from Arizona Chemical Co. The dispersions were concentrated and condoms were dip formed from this dispersion at about 0.04 to about 0.06 millimeters thickness. The films showed a tensile strength of 18.8 MPa, a modulus at 500 percent elongation of 2 MPa, and an elongation at break of 884 percent. The present dispersion-dipped condoms showed burst volumes and burst pressures similar to those of solution-dipped films. Gloves were dip formed using ceramic formers and the above dispersions.

EXAMPLE 7

An S-EB-S solution formulation was prepared by mixing 242.65 grams of Kraton G1652 and 169.9 grams of mineral oil in 2087.5 grams of toluene. A dispersion was prepared as in Example 4. The weight average molecular weight of the end blocks was estimated to be 7250 Daltons. Condoms dipped from this dispersion at 0.05 to 0.07 millimeters thickness showed signs of cracking of the film during drying and fusion of the film. The tensile strength of the film was 4.36 MPa and the modulus at 500 percent elongation was also about 4.36 MPa.

EXAMPLE 8

An S-EB-S solution blend was prepared using Kraton G1651 and Kraton G1652 with 70 phr mineral oil in toluene. A dispersion was made as in Example 4. The weight average molecular weight of the polystyrene end blocks of the blend was estimated to be about 24,000 Daltons. The dispersion was concentrated to 63.5 percent solids, and condoms were dip formed from this dispersion. The dispersion had excellent film forming characteristics and moderate strength.

EXAMPLE 9

An S-EB-S blend composition as detailed in Example 5 was prepared at about 21 weight percent solids. The dispersion was made using 3 kilograms of the solution and 4 kilograms of water containing 30 grams of Emcol K-8300 and 70 grams of potassium rosin soap in a Microfluidizer at 2200 pounds per square inch in 3 passes. A predispersion was made before passing through the Microfluidizer. The dispersion had an average particle size of 0.47 micrometers. The dispersion was stripped and concentrated. The dispersion showed good film-forming characteristics and good film strength properties.

EXAMPLE 10

An S-EB-S solution was prepared as in Example 5 and a dispersion made using the Ross X-Series mixer. The dispersion was concentrated to 61 weight percent solids The dispersion showed good stability and good film formation as in Example 5.

The present approach provides a technique for forming good-quality films from an aqueous dispersion. The films have the advantageous properties as disclosed in U.S. Pat. Nos. 5,112,900 and 5,407,715, but the dip-forming operation is more economical than the approach described in these patents. Although a particular embodiment of the invention has been described in detail for purposes of illustration, various modifications and enhancements may be made without departing from the spirit and scope of the invention.

Accordingly, the invention is not to be limited except as by the appended claims.

What is claimed is:

1. A method for the preparation of an elastomeric article, comprising the steps of:

furnishing an aqueous dispersion, comprising:

a dispersion medium consisting essentially of a mixture of water and a surfactant; and a plurality of particles dispersed in the dispersion medium, each particle comprising a mixture of a styrene-ethylene/butylene-styrene block copolymer, and an oil, wherein the end blocks of the styrene-ethylene/butylene-styrene block copolymer each have a weight average molecular weight of from about 15,000 Daltons to about 24,000 Daltons, wherein the end blocks constitute about 25–35 percent by weight of the total molecule, and wherein the step of furnishing an aqueous dispersion includes the step of furnishing a dispersion wherein the particles comprise a mixture of from about 30 to about 70 percent by weight oil, balance styrene-ethylene/butylene-styrene block copolymer;

dipping a form into the aqueous dispersion and withdrawing the form from the aqueous dispersion, leaving a film of the dispersion on the form; and evaporating the water from the dispersion on the form and heating the resulting film to fuse the film, leaving a coherent extensible film on the form.

2. The method of claim 1, wherein the step of furnishing an aqueous dispersion includes the step of furnishing a dispersion wherein the particles have an average size of no more than about 2 micrometers.

3. The method of claim 1, wherein the step of furnishing an aqueous dispersion includes the step of furnishing a dispersion wherein the styrene-ethylene/butylene-styrene block copolymer comprises block copolymers of substantially the same molecular weight.

4. The method of claim 1, wherein the step of furnishing an aqueous dispersion includes the step of furnishing a dispersion wherein the oil is a mineral oil.

5. The method of claim 1, wherein the step of furnishing an aqueous dispersion includes the step of furnishing a dispersion wherein the particles comprise a mixture of from about 30 to about 70 percent by weight oil, balance styrene-ethylene/butylene-styrene block copolymer.

6. The method of claim 1, wherein the step of furnishing includes the steps of preparing a first mixture comprising styrene-ethylene/butylene-styrene block copolymer, an oil, and a solvent, preparing a second mixture comprising water and a surfactant, mixing the first mixture and the second mixture together under high-shear conditions to form a dispersion, and stripping the solvent from the dispersion.

7. The method of claim 1, wherein the step of furnishing includes the steps of preparing a first dispersion comprising the styrene-ethylene/butylene-styrene block copolymer, a solvent, and water, stripping the solvent from the first dispersion, preparing a second dispersion comprising oil and water, and mixing the stripped first dispersion and the second dispersion together to form a third dispersion.

8. An elastomeric article prepared by the method of claim 1.

9. The method of claim 1, wherein the step of furnishing an aqueous dispersion includes the step of furnishing a dispersion wherein the styrene-ethylene/butylene-styrene block copolymer has end blocks each with a weight average molecular weight of from about 18,000 to about 20,000 Daltons.

10. The method of claim 1, wherein the step of furnishing an aqueous dispersion includes the step of preparing the dispersion with a solids level of from about 30 to about 65 percent.

11. The method of claim 1, wherein the step of furnishing an aqueous dispersion includes the step of preparing the dispersion with a solids level of from about 55 to about 63 percent.

12. The method of claim 1, including an additional step, after the step of evaporating, of leaching the film.

* * * * *